No. 708,644. Patented Sept. 9, 1902.
J. W. JOHNSON.
SMOKE CONSUMER.
(Application filed Apr. 15, 1902.)
(No Model.) 2 Sheets—Sheet 1.
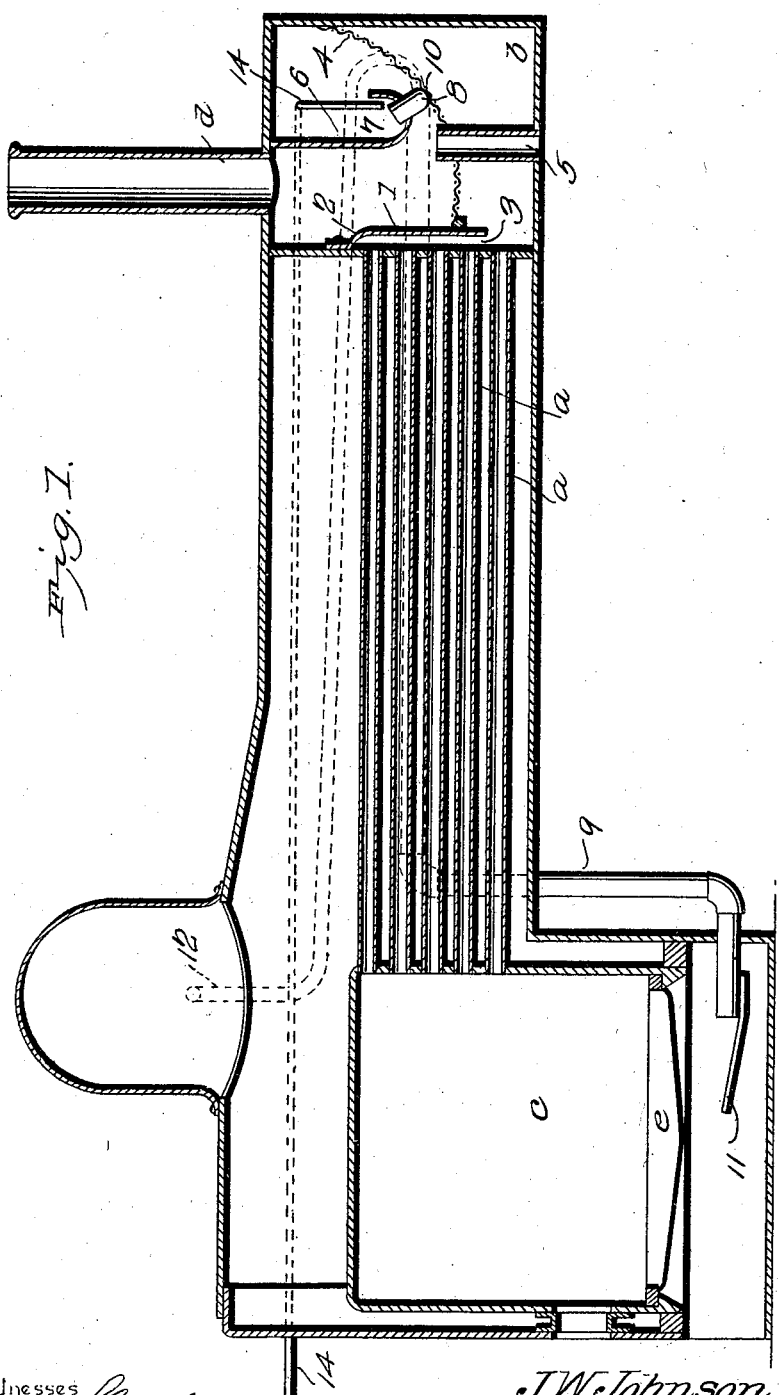
Fig. I.
Witnesses J. W. Johnson, Inventor
by C. A. Snow & Co
Attorneys No. 708,644. Patented Sept. 9, 1902.
J. W. JOHNSON.
SMOKE CONSUMER.
(Application filed Apr. 15, 1902.)
(No Model.) 2 Sheets—Sheet 2.
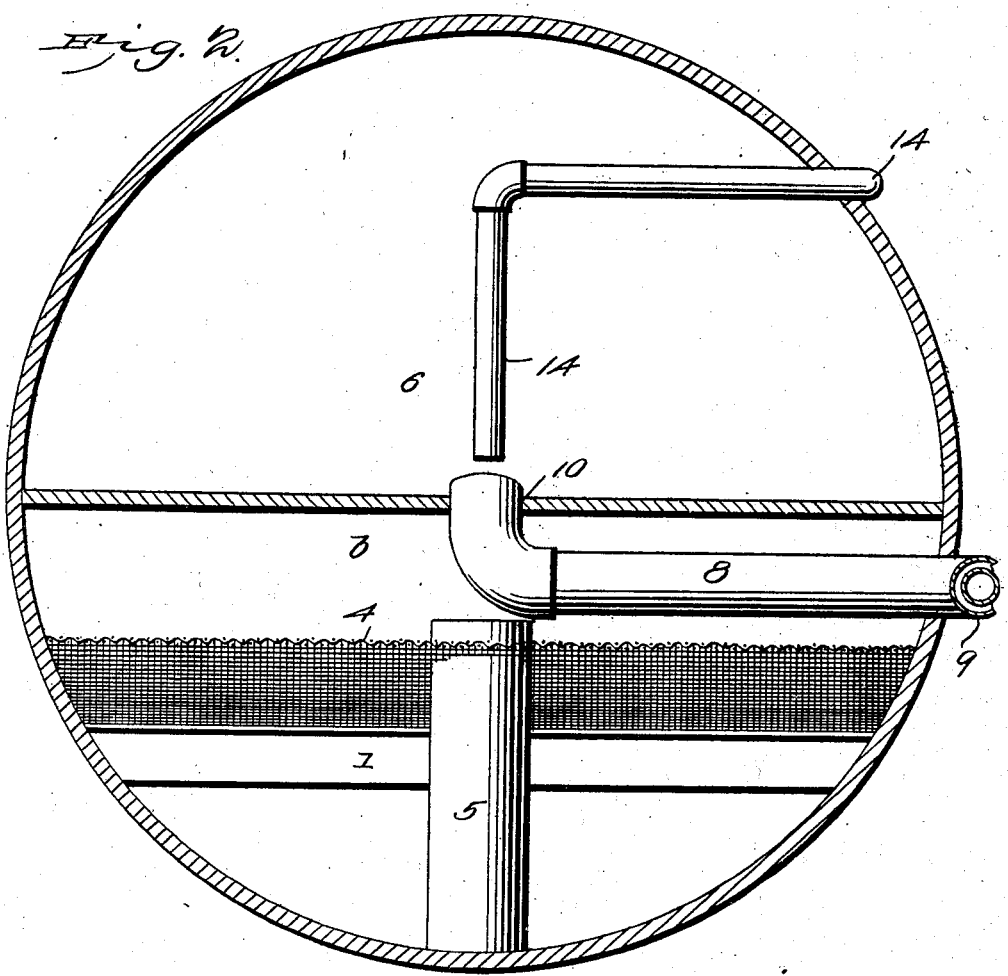
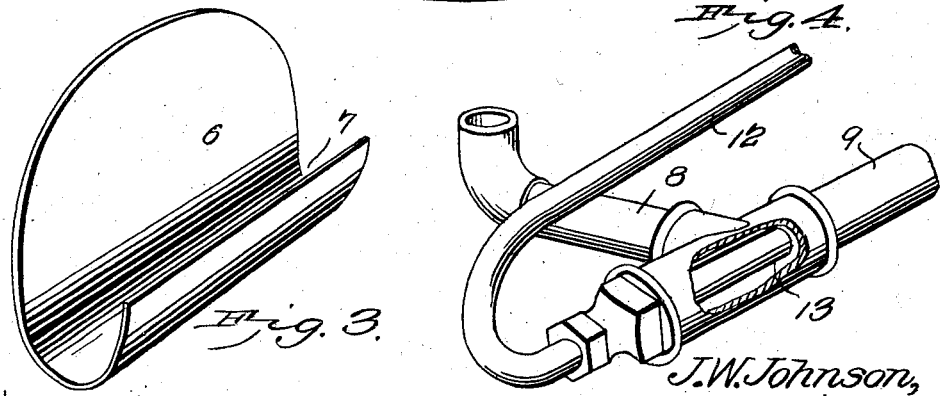
Witnesses
J. W. Johnson,
Inventor
by C. A. Snow & Co.
Attorneys

UNITED STATES PATENT OFFICE.

JOHN WALLACE JOHNSON, OF TRENTON, MISSOURI.

SMOKE-CONSUMER.

SPECIFICATION forming part of Letters Patent No. 708,644, dated September 9, 1902.

Application filed April 15, 1902. Serial No. 103,010. (No model.)

*To all whom it may concern:*

Be it known that I, JOHN WALLACE JOHNSON, a citizen of the United States, residing at Trenton, in the county of Grundy and State of Missouri, have invented a new and useful Smoke-Consumer, of which the following is a specification.

My invention relates to an improvement in smoke-consumers, especially adapted for use in connection with locomotives and other steam-boilers for returning the smoke, gases, and other products of combustion to the fire and causing the same to be consumed, thereby effecting an economy of fuel and increasing the heating efficiency thereof; and my invention consists in the peculiar construction and combination of devices hereinafter fully set forth and claimed.

In the accompanying drawings, Figure 1 is a vertical longitudinal sectional view of a locomotive-boiler and furnace provided with a smoke-consuming apparatus embodying my improvements. Fig. 2 is a vertical sectional view of the same, taken on a plane indicated by the line $a\ a$ of Fig. 1. Fig. 3 is a detail perspective view of the pocket or funnel which is disposed in the smoke-box. Fig. 4 is a sectional perspective view showing the connection between the steam-pipe and the return-pipe through which the smoke, gases, and other products of combustion are returned to the fire.

In the embodiment of my invention here shown I provide a baffle 1, which is disposed opposite the discharge ends of the boiler-tubes $a$ and is located in the smoke-box $b$, the said baffle being closed against the boiler-head above the tubes $a$, as at 2, and open at its lower side, as at 3, so that the smoke, gases, and other products of combustion which pass from the fire-box $c$ of the furnace through the tubes $a$ are deflected downwardly and discharged into the lower side of the smoke-box $b$ by the said baffle 1. I also show in this embodiment of my invention a screen 4, which is disposed in the smoke-box and extends from the baffle to the head of the smoke-box, the function of this screen being to arrest sparks; but this screen is not an essential feature of my invention, and I do not limit myself in this particular. As here shown, the upper end of the exhaust-pipe 5, which is located in the smoke-box and through which the exhaust-steam from the engine-cylinders is discharged into the smoke-box and from there to the funnel or smoke-pipe $d$, extends through the screen 4 and is disposed in advance of the baffle 1.

In the upper portion of the smoke-box and extending downwardly therein for a suitable distance and transversely from side to side thereof is a funnel or pocket 6, at the lower side of which is formed a forwardly-extending trough 7. An intake-pipe 8 has its upper end, which is open, extended through the bottom of the trough 7 of the funnel 6, and said intake-pipe extends transversely through one side of the smoke-box and is coupled to the front end of a return-pipe 9, as at 10. The said return-pipe extends rearwardly and discharges under the grate $e$ of the fire-box and is provided at its discharge end with an upwardly-inclined spray-plate 11, the function of which is to direct the smoke, gases, and products of combustion, which are returned by the return-pipe to the ash pit or space under the grate, upwardly through the burning mass of fuel in the fire-box, so that the said smoke, gases, and products of combustion will be caused to pass through the mass of burning fuel in the fire-box and be consumed thereby. A steam-pipe 12 is here shown as leading from the steam-dome of the boiler and as discharging into the coupling 10 at the front end of the return-pipe 9 through a nozzle 13. In practice this steam-pipe may be connected to the boiler in any suitable manner to enable live steam to be discharged into the return-pipe through the said steam-pipe, and hence I do not limit myself in this particular.

It will be understood that while live steam is discharged from the nozzle of the pipe 12 rearwardly into the return-pipe 9 a partial vacuum will be created and maintained in the intake-pipe 8, and hence the smoke, gases, and products of combustion will be drawn from the smoke-box through the intake-pipe 8, discharged by the latter into the return-pipe, and the steam which is discharged through the return-pipe from the pipe 12 will cause the smoke, gases, and products of combustion to be discharged by said pipe under the grate and upwardly through the fire in the fire-box, as hereinbefore stated. A blowpipe 14 is here shown as discharging downwardly into the trough 7 of the funnel 6 at a point near the intake end of the intake-pipe 8. In practice this blowpipe may be connected to the compressed-air reservoir of the locomotive and provided with a suitable valve, by which means compressed air may be discharged from said blowpipe downwardly into the trough 7 near the intake end of the pipe 8 to blow away cinders and other accumulations when it becomes necessary to do so in order to keep the intake-pipe clear. It will be understood that the blowpipe may be so connected to the boiler as to cause steam under pressure to be discharged therethrough for the same purpose, and hence I do not limit myself in this particular.

It is well known that smoke is discharged from the funnels of locomotives and from the furnaces of other engines in which the exhaust from the engines is used to promote draft only while the engines are exhausting. My provision of the steam-pipe 12, intake-pipe 8, and the return-pipe 9, together with the funnel 6, causes the smoke to be drawn from the fire-box during the intervals between the exhaust and returned to the furnace and consumed therein. Hence the discharge of unconsumed smoke and products of combustion through the smoke-stack with the exhaust-steam is practically prevented.

Having thus described my invention, I claim—

1. A smoke-consumer for steam-boiler furnaces, comprising a funnel in the smoke-box in advance of the smoke-stack and forming a partition in the upper portion of the smoke-box, a downwardly-directed baffle in the smoke-box in rear of the smoke-stack, an intake-pipe leading from the funnel, a return-pipe into which the intake-pipe discharges, said return-pipe discharging into the furnace, under the fire-box, and means to discharge a jet of live steam rearwardly in the return-pipe and thereby maintain an exhaust-current of air through the intake-pipe, substantially as described.

2. A smoke-consumer for steam-boiler furnaces, comprising a downwardly-directed baffle in the smoke-box in rear of the smoke-stack, a funnel forming a transverse partition in the upper portion of the smoke-box in advance of the smoke-stack and having a trough on its front side, an air-exhaust pipe leading from the said trough, to the furnace, under the fire-box, and having its intake end extended through the bottom of the trough and projecting upwardly therein, means to maintain an exhaust current of air through the said pipe, and a blower, discharging into the trough and on the intake end of the air-exhaust pipe to keep the latter clear, substantially as described.

3. A smoke-consumer for steam-boiler furnaces comprising a downwardly-directed baffle in the smoke-box, in rear of the smoke-stack, a transversely-disposed partition across the upper portion of the smoke-box, in advance of the smoke-stack, a funnel in front of said partition, a pipe leading from said funnel to the furnace, and means to maintain an exhaust current of air through said pipe, substantially as described.

4. In combination with a boiler having draft-tubes, a smoke-box into which they discharge, a smoke-stack leading from the smoke-box and an exhaust-steam pipe discharging into the smoke-box, a downwardly-directed baffle on the boiler-head, opposite the discharge ends of the draft-tubes, a transversely-disposed funnel in the upper portion of the smoke-box, forming a partition therein in advance of the smoke-stack and having a trough on its front side, an intake-pipe leading from said trough, a return-pipe communicating with the intake-pipe and discharging into the furnace under the fire-box, and a steam-pipe having a rearwardly-directed nozzle in the return-pipe to discharge a jet of steam under pressure therein and thereby maintain an exhaust current of air through the intake-pipe, substantially as described.

5. A boiler having a smoke-box into which the smoke-flues discharge, a smoke-stack leading from the smoke-box, a downwardly-directed baffle in the smoke-box in rear of the smoke-stack, a transversely-disposed partition across the upper portion of the smoke-box in advance of the smoke-stack, and having a funnel on its front side, a steam-exhaust pipe discharging upwardly in the smoke-box, between the baffle and the partition, a pipe leading from the funnel to the furnace, and means to maintain an exhaust current of air through said pipe, substantially as described.

In testimony that I claim the foregoing as my own I have hereto affixed my signature in the presence of two witnesses.

JOHN WALLACE JOHNSON.

Witnesses:
SAMUEL HILL,
JAMES FRENCH.